No. 674,959. Patented May 28, 1901.
C. CARROLL.
DUMPING WAGON.
(Application filed Mar. 14, 1900.)

(No Model.) 2 Sheets—Sheet 1.

WITNESSES:

INVENTOR
Charles Carroll.
BY
ATTORNEYS

No. 674,959. Patented May 28, 1901.
C. CARROLL.
DUMPING WAGON.
(Application filed Mar. 14, 1900.)
(No Model.) 2 Sheets—Sheet 2.
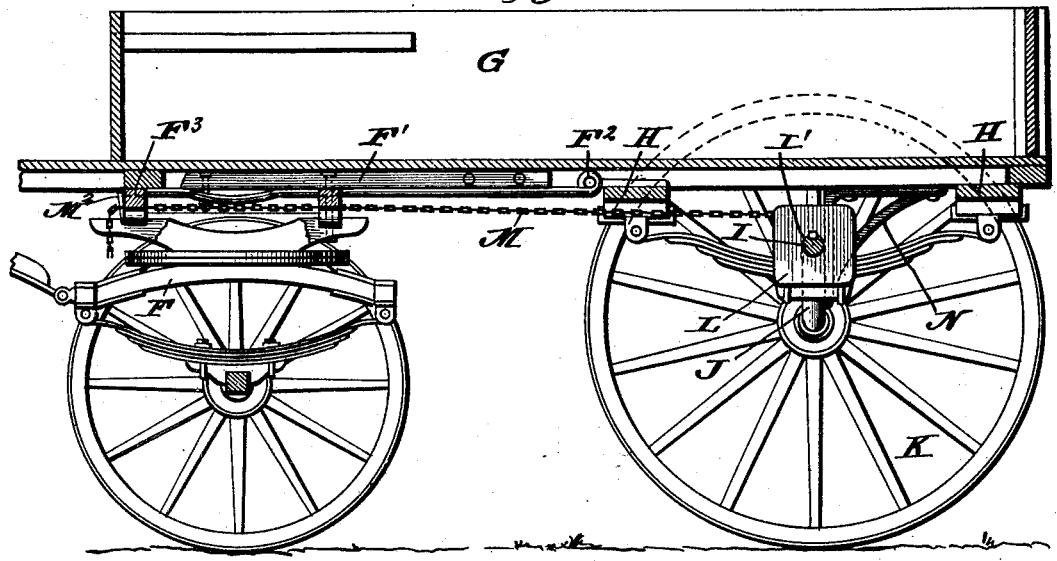
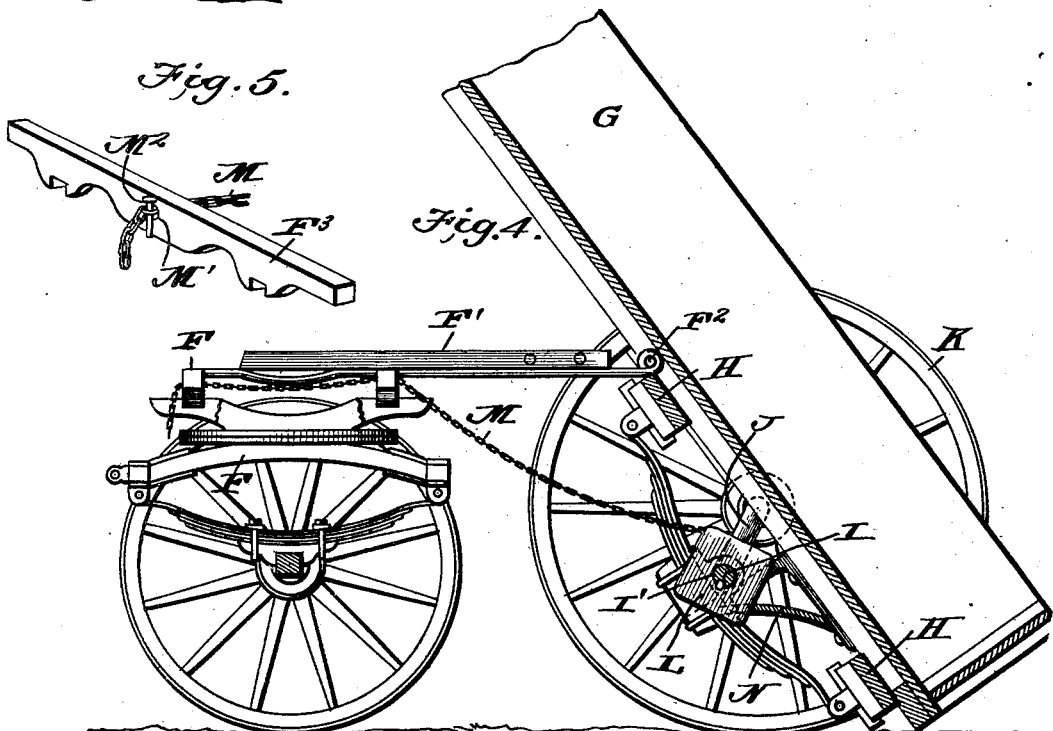
WITNESSES: INVENTOR
Charles Carroll.
BY
ATTORNEYS

UNITED STATES PATENT OFFICE.

CHARLES CARROLL, OF CHICAGO, ILLINOIS.

DUMPING-WAGON.

SPECIFICATION forming part of Letters Patent No. 674,959, dated May 28, 1901.

Application filed March 14, 1900. Serial No. 8,621. (No model.)

*To all whom it may concern:*

Be it known that I, CHARLES CARROLL, residing at Chicago, in the county of Cook and State of Illinois, have made certain new and useful Improvements in Dumping-Wagons, of which the following is a specification.

My invention is an improvement in dumping-wagons; and it consists in certain novel constructions and combinations of parts, as will be hereinafter described and claimed.

Figure 1:
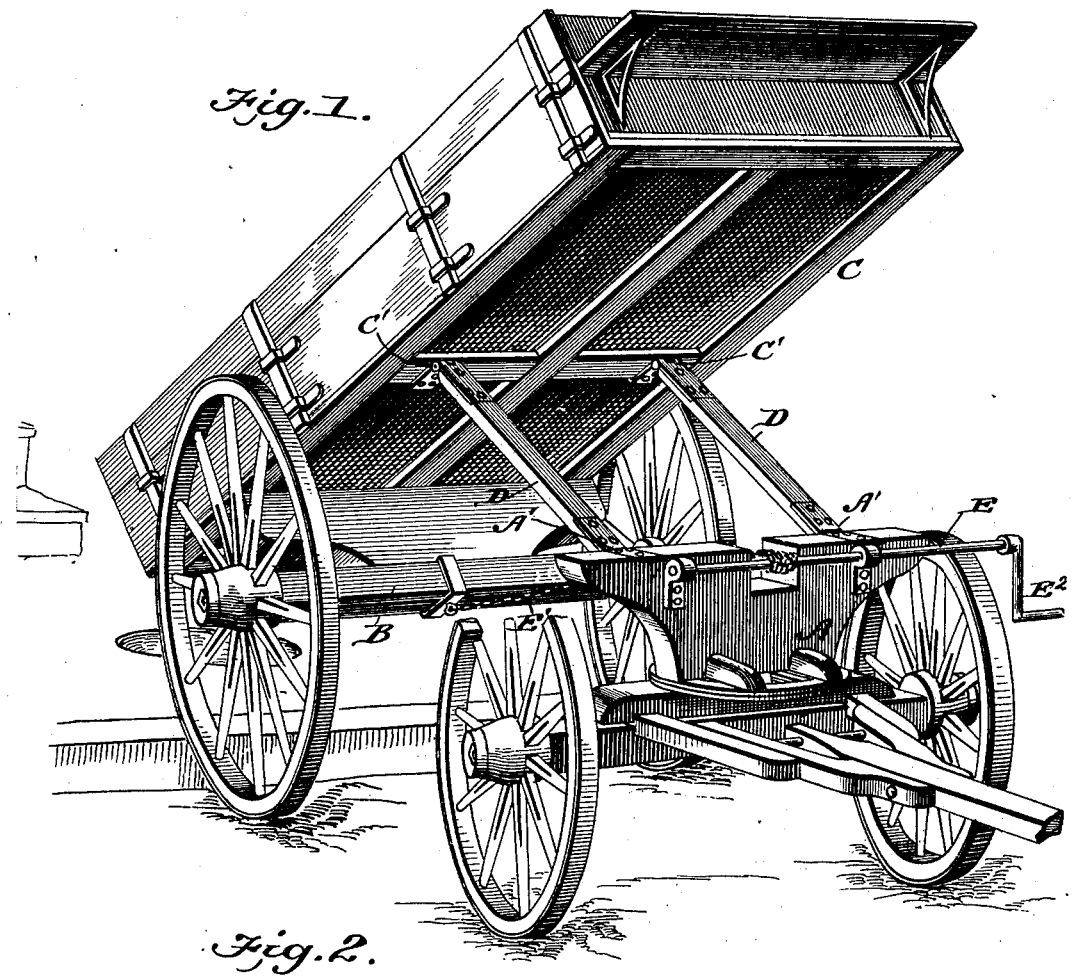
Figure 2:
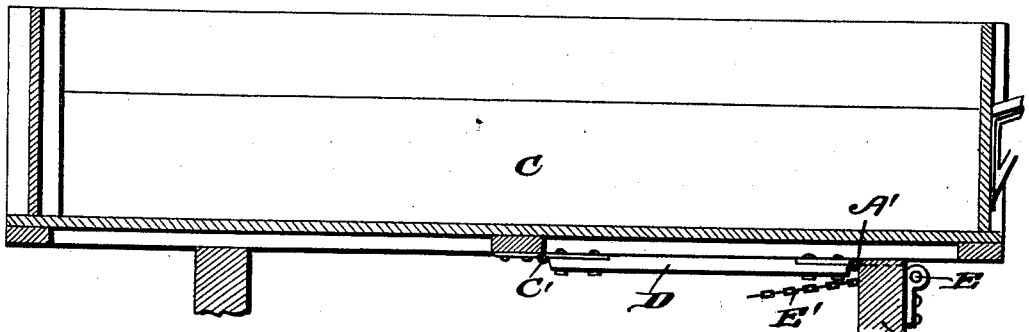

In the drawings, Figure 1 is a perspective view of a wagon embodying my invention with the body adjusted to dumping position, and Fig. 2 is a partial vertical longitudinal section showing the body in normal condition. Fig. 3 is a vertical longitudinal section of a wagon embodying the broad principles of my invention and differing somewhat in construction from that shown in Fig. 1. Fig. 4 is a vertical longitudinal section illustrating the wagon shown in Fig. 3 with the body adjusted to dumping position, and Fig. 5 is a detail perspective view of the front bar or bolster of the front truck shown in Figs. 3 and 4.

By my invention I seek to provide a simple construction in which the body of the wagon is hinged, so it can be readily tilted to dumping position. This may be effected by the specific construction shown in Fig. 1 or by that shown in Figs. 3 and 4.

In the construction shown in Fig. 1 the front truck A and the rear truck B, as well as the body C, may in general respects be of ordinary construction. The body C is fixed on the rear truck B, so the latter tilts in adjusting the body into and out of dumped position. The body C has a hinge connection at C' with the front truck, this being preferably effected by means of bars D, which extend rearwardly from the front truck A and are preferably hinged to said front truck A at A', as shown in Figs. 1 and 2. By this construction the bars D operate when the wheels of the front and rear trucks are caused to approach each other to elevate the body C in advance of the rear truck and so tilt the said body from the position shown in Fig. 2 to that shown in Fig. 1. In adjusting the body C to dumped position it will be seen the body is tilted on the hinged connection C', also that the said hinge connection C' and the rear axle are caused to depart, the hinge connection rising relatively to the rear axle to secure the desired tilting of the body to dumped position.

I may cause the front and rear wheels to approach each other by means of the windlass E and chain E', as shown in Figs. 1 and 2, or the dumping may be effected by chocking the rear wheels of the wagon—as, for instance, against a curbing—as shown in Fig. 1, and then backing the front wheels, as will be readily understood from said Fig. 1; but the windlass E and the chain E' permit the dumping operation at any desired point and render the operation independent of any chocking of the rear wheels. As shown, the windlass E is suitably journaled to the front bolster A and has a crank-handle $E^2$, so it can be turned, and the chain E' is secured to the windlass and extends thence rearwardly and connects with the rear truck D, preferably at the lower portion thereof. By this construction the rear wheels may be drawn forcibly forward to tilt the body to dumped position.

In Figs. 3 and 4 I show a somewhat different construction in which the front truck F has the bars F' fixed rigidly to it and extending rearwardly and hinged at $F^2$ to the body G, which is secured to the rear truck H. To this bolster is journaled at I' the rear axle I, which is provided with crank-arms J, which carry the spindles for the rear wheels K. On the axle I is secured a pulley L, which may preferably be of the rectangular form shown and has fixed to it a chain M, which extends forward through an opening M' in the front bolster $F^3$ of the front truck F and may receive a bolt or pin $M^2$, as shown in Figs. 3 and 5, when it is desired to secure the parts in the adjustment shown in Fig. 3.

As shown in Fig. 3, the crank-arms J of the axle I extend downwardly from said axle and bear rearwardly against the front edges of suitable stops N, which may be in the form of brackets secured to the body G, as shown. When in this position, the chain M, being drawn taut and secured, operates to prevent the turning of the axle and the lowering of the rear end of the body G to the position shown in Fig. 2. If, however, it is desired to dump the wagon, it is only necessary to release the fastening M² and back the wagon slightly, when it will automatically dump, the parts assuming the position shown in Fig. 4. To readjust the body to the position shown in Fig. 3, it is only necessary to draw upon the chain M, which will operate through the pulley L to turn the axle I to bring the several parts to the position shown in Fig. 3. In this construction, as in that shown in Fig. 1, I provide a tilting rear truck, secure the body thereto, connect it by a hinge-joint with the forward truck by means of bars which extend rearwardly from the forward truck, and furnish means whereby the hinge-connection of the body and the axle of the rear truck may be caused to depart to effect a dumping of the wagon.

Having thus described my invention, what I claim as new, and desire to secure by Letters Patent, is—

1. A dumping-wagon comprising the front truck, the rear truck, said trucks being movable relatively toward each other, the body fixed to the rear truck, a hinge connection between the front truck and the body, and means whereby the body may be tilted on said hinge connection to dumping position.

2. A dumping-wagon comprising the front truck, the rear truck having an axle, said trucks being movable relatively toward each other, the body fixed to the rear truck, a hinge connection between the body and the front truck, and means whereby the hinge connection may be caused to rise whereby to effect a dumping of the wagon.

3. A dumping-wagon comprising the rear tilting truck the body secured to the rear truck, the front truck provided with rearwardly-projecting bars hinged to the body, and means whereby the body may be tilted on such hinge connection to dumped position, said trucks being movable relatively toward each other.

4. A dumping-wagon substantially as described, comprising the front truck, the rear truck, the body connected with the rear truck, the connecting-bars hinged at their front ends to the front truck and hinged at their rear ends to the body at a point between the two trucks and means by which the front and rear trucks may be adjusted relatively toward each other whereby to elevate the hinge connection between the connecting-bars and the body substantially as set forth.

5. The combination of the front truck, the rear truck, the body fixed to the rear truck, bars hinged at one end to the front truck and at their other ends to the body, the trucks being movable relatively toward each other to elevate the joint between the connecting-bars and the body to lift the front end of the body, whereby the adjustment of the trucks toward each other may operate to elevate the hinged joint between the connecting-bars and the body substantially as set forth.

6. The combination of the body, the rear truck, the front truck, the bars hinged to said front truck and body, the windlass on the front truck, and connections between said windlass and the rear truck.

7. The combination substantially as described of the front truck having rearwardly-projecting bars, the body hinged to the rear ends of said bars, and the rear truck to which said body is secured and provided with the journaled axle having crank-arms supporting the rear wheels, said trucks being movable relatively toward each other substantially as set forth.

8. A dumping-wagon comprising the rear truck, the front truck movable toward and from the rear truck, the body fixed to the rear truck, and the bars hinged at their front ends to the front truck so their rear ends can rise and fall and hinged at their rear ends to the body in advance of the connection of the body with the rear axle, said bars and body forming the only connection between the front and rear trucks whereby when the trucks are caused to approach each other to dump the wagon there will be no obstruction to prevent the turning of the axle of the front truck to a position at right angles to the rear axle to set one of the front wheels beneath the elevated body substantially as set forth.

9. The dumping-wagon herein described comprising the rear truck, the front truck, the body fixed to the rear truck, the connecting-bars hinged at their front ends to the front truck and at their rear ends to the body, the windlass journaled to the front truck, and connections between the windlass and the rear truck whereby the windlass may be operated to adjust the trucks toward each other and to elevate the hinged joint between the connecting-bars and the body all substantially as set forth.

CHARLES CARROLL.

Witnesses:
SHERMAN P. STILES,
JAMES F. METCALF.